United States Patent Office 3,280,552
Patented Oct. 25, 1966

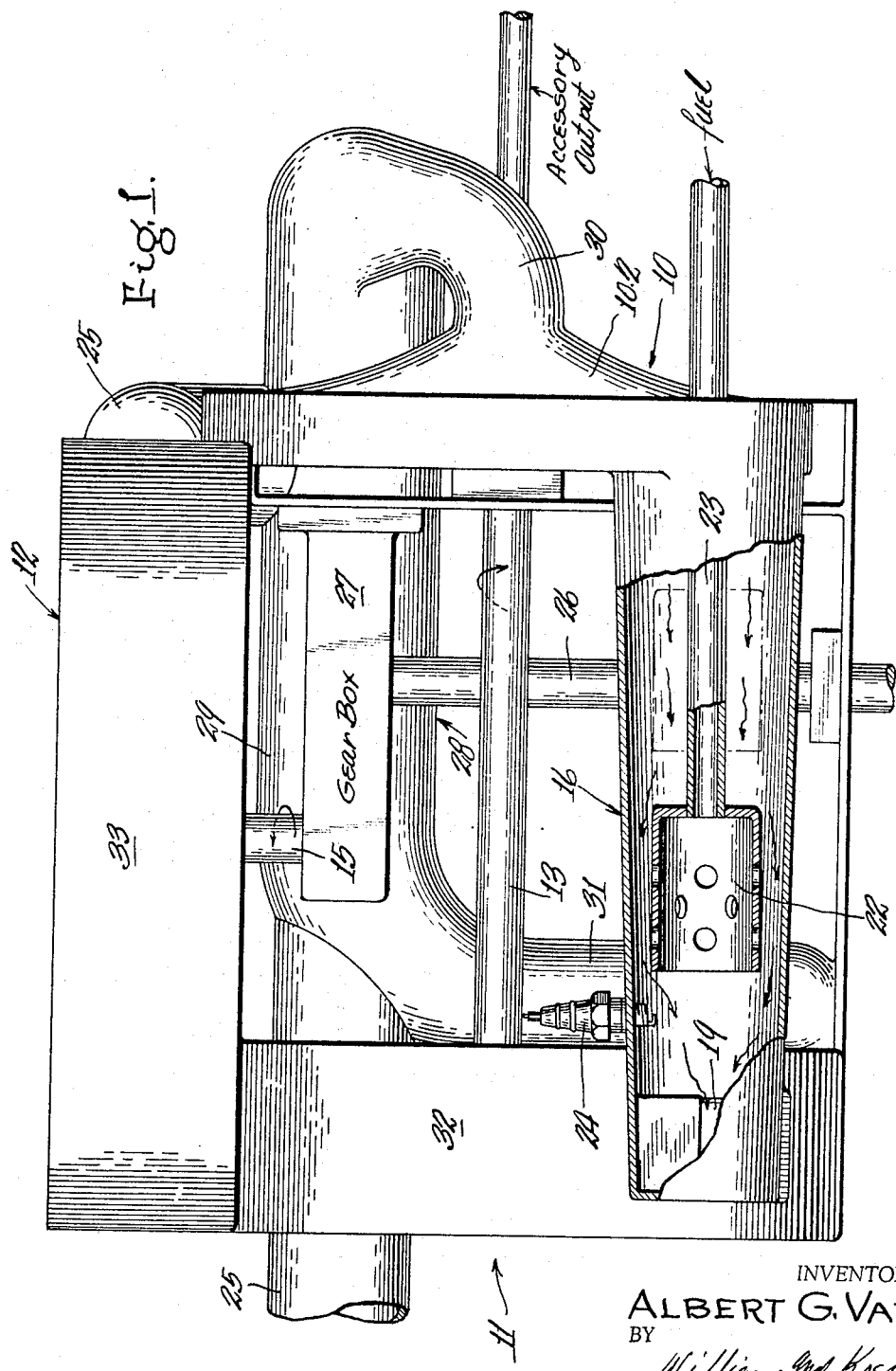

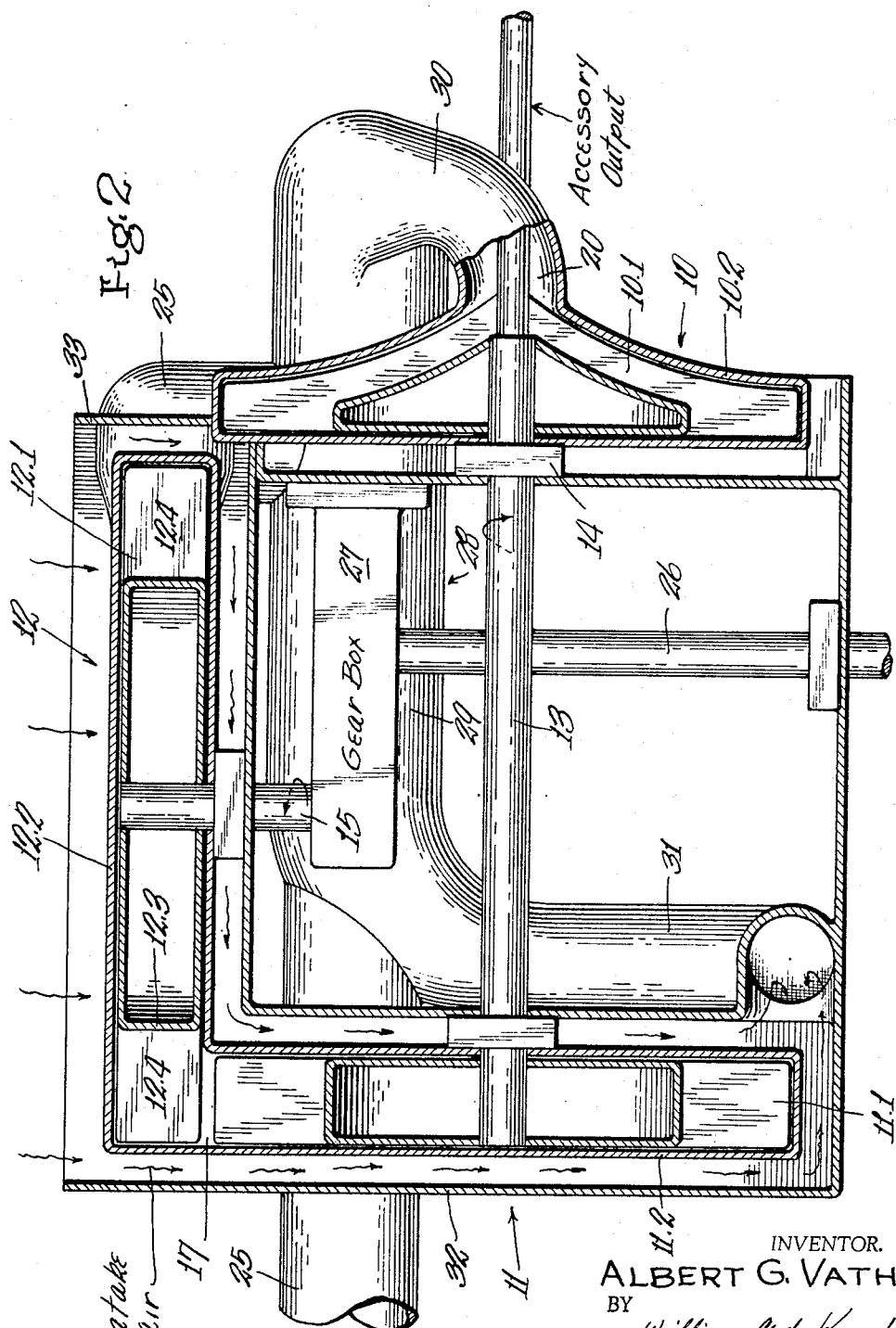

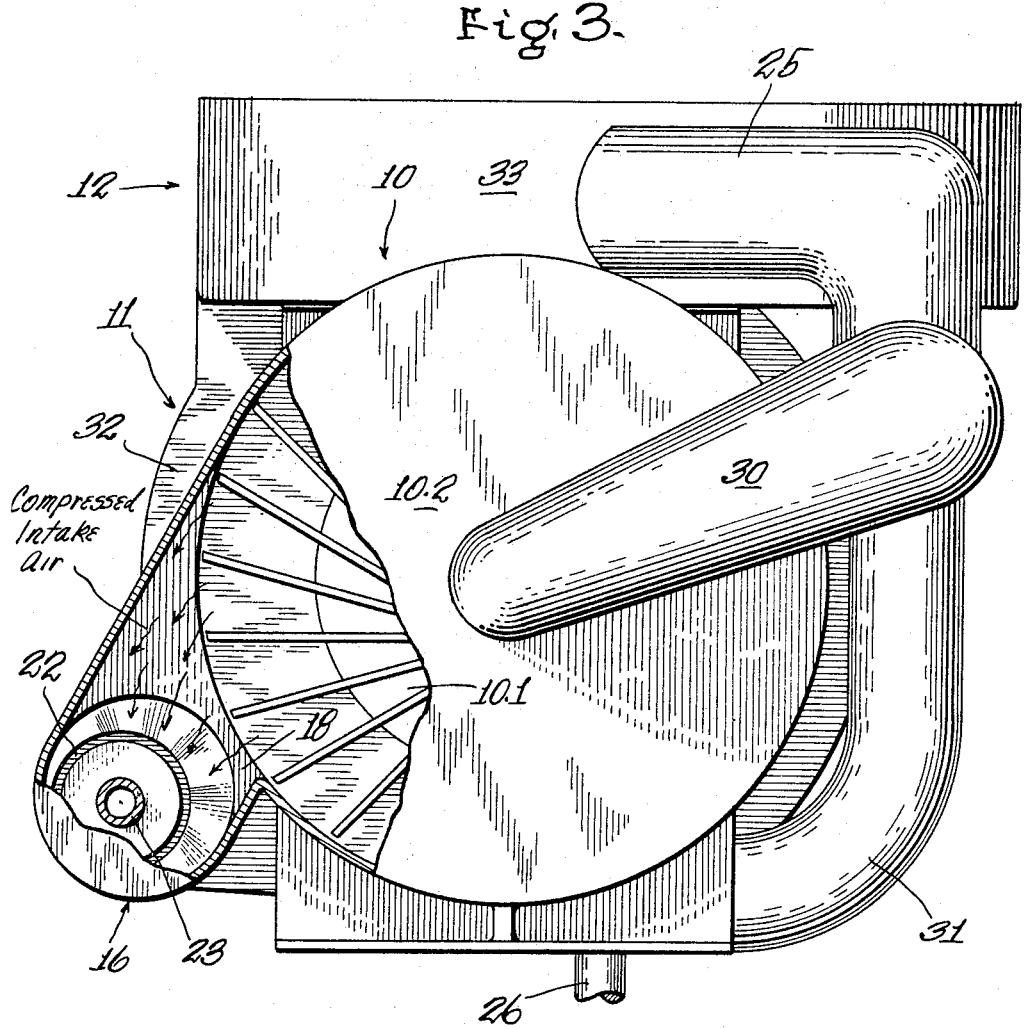

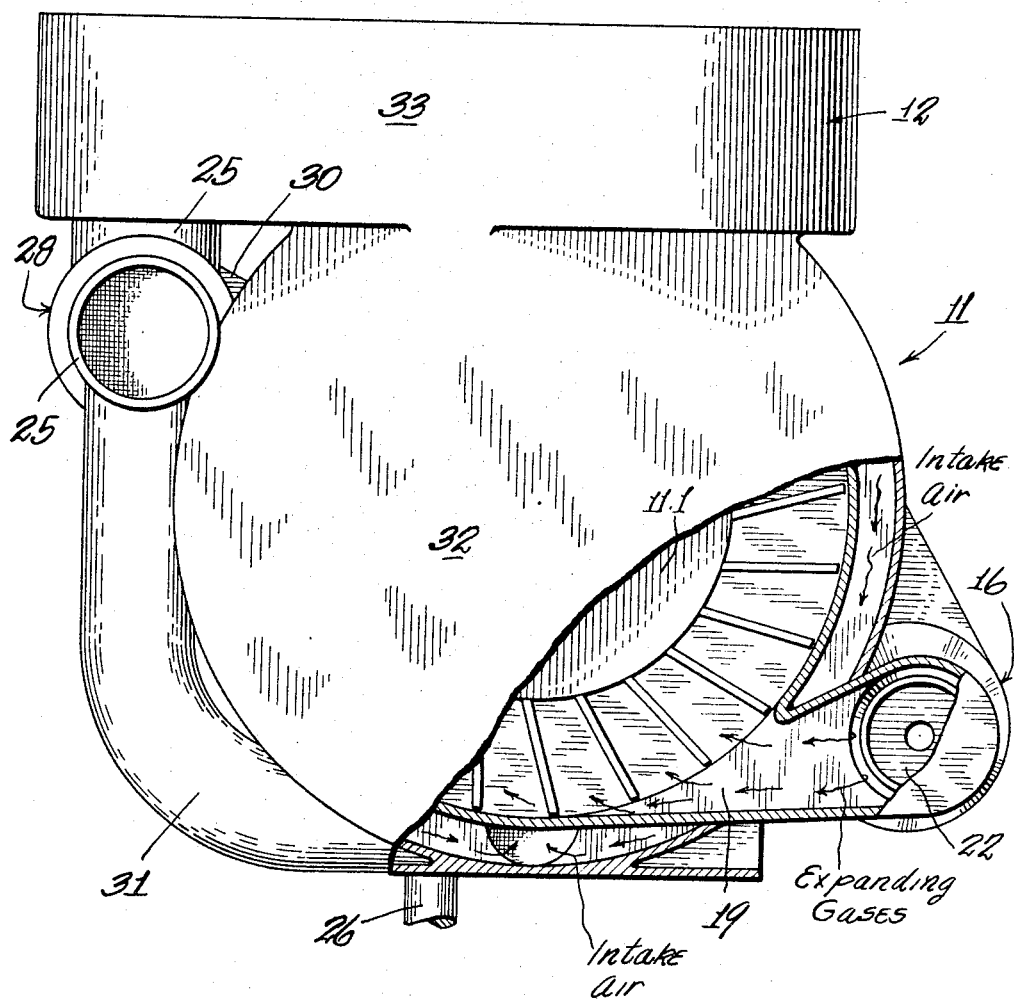

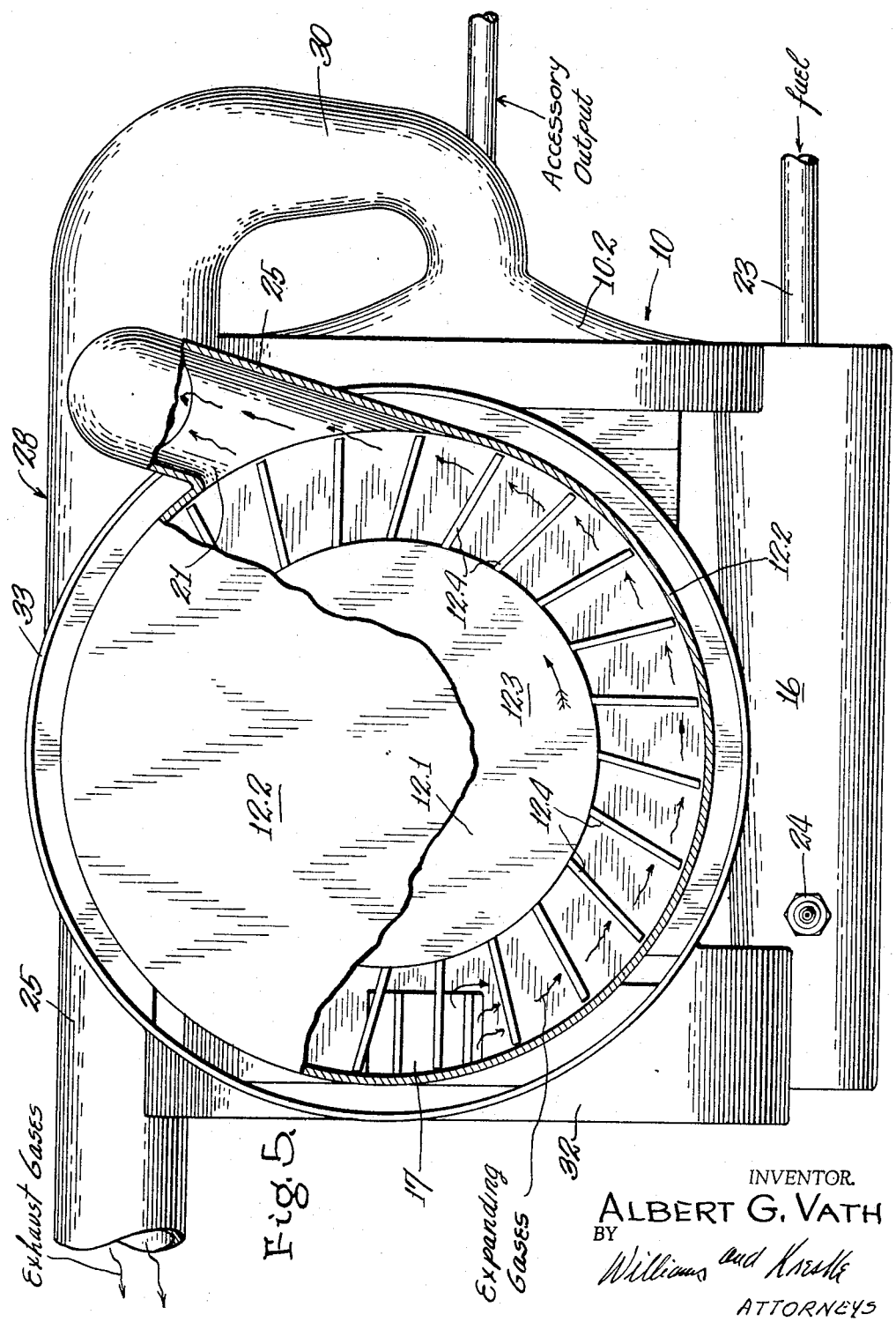

3,280,552
GAS TURBINE ENGINES AND METHOD OF
OPERATING THE SAME
Albert G. Vath, 144 Flowers Ave., Sharon, Pa.
Filed Dec. 26, 1963, Ser. No. 333,396
1 Claim. (Cl. 60—39.16)

The present invention relates to gas turbine engines and to methods of operating the same, and the principal object of the invention is to provide new and improved apparatus and methods of the character described.

Despite the many advantages of gas turbine engines over reciprocating engines, the former have thus far been used only experimentally in motor vehicles. Some of the reasons for lack of more widespread use is high fuel consumption, particuarly at less than full power output; high initial cost due to the necessity of using expensive materials capable of resisting the stresses of very high rotational speeds at elevated temperatures; and a disconcerting time lag between lower power and high power output.

The present invention eliminates, or markedly reduces, the aforesaid drawbacks of prior art gas turbines in a simple, effective manner. Other advantages of the present invention will readily become apparent from a study of the following description and from the drawings appended hereto.

In the drawings accompanying this specification and forming a part of this application there is shown, for purpose of illustration, an embodiment which the invention may assume, and in these drawings:

FIGURE 1 is a side elevational view of a preferred embodiment of the invention, portions on the near side being broken away to show certain underlying structure, FIGURE 2 is a view in the same direction as FIGURE 1 but showing the invention in longitudinal section, and FIGURES 3, 4 and 5 are front elevational, rear elevational and top plan views respectively, portions on the near side being broken away in each instance to show certain underlying structure.

With reference to FIGURES 1 and 2, the present device is similar to many contemporary gas turbines in that it comprises a compressor section 10, a first stage power section section 11, and a second stage power section 12. Each of the sections aforesaid comprise housings in which turbine wheels are rotatably mounted, the compressor section 10 having a turbine wheel 10.1 within a housing 10.2, the first stage power section 11 having a turbine wheel 11.1 within a housing 11.2, and the second stage power section 12 having a turbine wheel 12.1 within a housing 12.2. As in conventional apparatus of this type, the compressor wheel 10.1 and the first stage power wheel 11.1 are affixed to the same shaft 13 mounted on suitable bearings 14 whereby the compressor turbine wheel will be driven by the first stage turbine wheel. As herein illustrated, the compressor section 10 and the first stage power section 11 are axially spaced-apart with the second stage power section 12 disposed therebetween, the shaft 15 on which the second stage turbine wheel 12.1 is mounted being disposed at right angles to the shaft 13 aforesaid. This arrangement of the sections 10, 11 and 12 makes for a very compact unit as will readily be apparent.

Interconnecting the compressor housing 10.2 and the first stage housing 11.2 is a combustion chamber 16 and, as best seen in FIGURE 2, the first and second stage housings 11.2, 12.2 overlap and are in communication with each other at their peripheries through an opening 17 (FIGURE 5). The input end of the combustion chamber 16 is in communication with the compressor housing 10.2 through an opening 18 (FIGURE 3) while the output end of the combustion chamber is in communication with the first stage housing 11.2 through an opening 19 (FIGURE 4). Finally, compressor housing 10.2 has a central inlet 20 (FIGURE 2) while second stage housing 12.2 has a peripheral outlet 21 (FIGURE 5). Shaft 13, on which are mounted the compressor and first stage wheels, is best seen in FIGURE 2 to extend through the compressor housing 10.2 and is arranged to drive certain engine accessories (not shown) such as a generator, fuel pump and etc. A suitable starter (not shown) may also have connection with the extended portion of shaft 13 for effecting initial rotation thereof when the engine is to be started.

With the construction thus far described and assuming the shaft 13 to be rotating in the direction indicated in FIGURE 1, air will be drawn in the compressor housing opening 20 and discharged at a high velocity and pressure into the input end of the combustion chamber 16. The air will flow through the combustion chamber where it will be mixed with liquid fuel discharged from a nozzle 22 which is fed through a pipe 23. The fuel-air mixture will be ignited, as by a spark plug 24, and the rapidly expanding gasses thus produced will enter the first stage housing 11.2 through the peripheral housing opening 19 (FIGURE 4).

As the hot gasses escape into the first stage housing 11.2, they will impinge upon the blades of the turbine wheel 11.1 thus causing the latter to rotate in the direction indicated. This rotation of first stage wheel 11.1 will, in turn, rotate compressor wheel 10.1 thus making the process continuous so long as fuel is supplied to the combustion chamber.

The hot, still expanding gasses aforesaid will escape from the first stage housing 11.2 into the second stage housing 12.2 through the opening 17 to impinge upon the blades of second stage turbine wheel 12.1 thus causing rotation of the latter in the direction indicated. The exhaust gasses will escape from the second stage housing 12.2 through the peripheral opening 21 into an exhaust pipe 25 for discharge into the atmosphere.

If desired, the relatively high rotational speed of the second high rotational speed of the second stage turbine wheel 12.1 may be reduced to a more useful value by connecting shaft 15 to an output shaft 26 through a suitable reduction gear box 27.

It is well-known that for maximum economy of a gas turbine engine, air should be preheated before it is mixed with the fuel. A very convenient way of doing this is to utilize the heat in the exhaust gasses to thus not only pre-heat the air but to also cool the exhaust gasses to a less dangerous level. This is accomplished in the present embodiment by passing both the exhaust gasses and inlet air through a heat exchanger 28.

As herein disclosed, heat exchanger 28 comprises a radially enlarged inlet air conduit 29 (see especially FIGURE 2) having an outlet portion 30 connected to inlet 20 of compressor housing 10.2 and an inlet portion 31 connected in a manner later to be disclosed but adapted to pull in fresh air. Exhaust pipe 25 leads from the second stage housing 12.2 concentrically through the enlarged conduit 29 wherein heat is absorbed from the exhaust pipe by the inlet air passing through such conduit and about the exhaust pipe.

Obviously, the simple heat-exchanger herein disclosed is illustrative only and could be replaced by other more efficient designs. Also, while the present design is believed to be superior with the heat-exchanger upstream from the compressor, it is to be understood that it could be disposed downstream therefrom and before the combustion chamber if desired.

An important feature of the present invention is that not only is the incoming air warmed by the heat-exchanger 28, it is also warmed by using it to cool the first and second stage housings 11.2, 12.2. As best seen in FIGURE 2, first stage housing 11.2 is enclosed in a duct 32 connected to a duct 33 which, encloses the second stage housing. The duct walls are spaced from respective adjoining housing walls to provide an air space therebetween and the upper part of duct 33 is open for free entrance of air. The previously mentioned inlet conduit portion 31 is connected to the lower portion of duct 32 as illustrated.

With shaft 13 rotating in the direction indicated, air will be drawn by the compressor wheel 10.1 through the ducts 33, 32 and over the housings 12.2, 11.2 for cooling the housings. After cooling the housings, such now warmed air will pass through the heat exchanger 28 where its temperature will further be raised before it is compressed in the compressor section 10 and fed to the combustion chamber 16.

One drawback of conventional gas turbine engines that limits their usefulness is their time lag between partial power output and full power output. Before disclosing how the present invention markedly reduces this heretofore inherent lack of responsiveness, a theory for its existence will first be discussed in combination with the structure as thus far described.

Assuming the apparatus as thus far disclosed is operating at a very low power output, it will be understood that the first stage turbine wheel 11.1 is rotating the shaft 13 and the compressor wheel 10.1 at relatively low speed and that but a relatively small amount of fuel is being fed into the combustion chamber 16 for burning the presence of the relatively small but excess volume of air being forced thereinto by the compressor section. Under these conditions, the flow of gasses to the second stage housing is so small that there will be little tendency to rotate the second stage turbine wheel 12.1.

When an increase in power is required, additional fuel will be discharged into the combustion chamber 16 for burning with the excess air therein thus causing more gasses to be discharged into the first stage turbine housing 11.2. The greater flow of gasses into the first stage housing will increase the speed of the first stage turbine wheel 11.1, the shaft 13, and the attached compressor wheel 10.1. The increasing speed of the compressor wheel 10.1 will pump an ever increasing amount of air into the combustion chamber 16, such ever increasing amount of air being able to support combustion of an ever increasing amount of fuel. As more fuel is added to the increasing flow of air, an ever increasing volume of gasses will enter the first stage housing 11.2 to drive the first stage wheel 11.1 at an even greater speed until its maximum speed is reached. As the flow of gasses through the first stage housing 11.2 increases, the flow of such gasses through the second stage housing 12.2 will correspondingly increase thus driving the second stage turbine wheel at an ever increasing speed to develop more and more power at the output shaft 26.

From the foregoing, it will readily be apparent that the increase in power output will take place slowly, especially during the initial stages, since an increase in the volume of gasses discharged from the combustion chamber necessarily awaits an increase in speed of the compressor wheel.

In order to reduce the previously described lag in power output, the present invention contemplates operating the first stage wheel 11.1, the shaft 13, and the compressor wheel 10.1 at relatively high speed even at low power outputs. It also contemplates maintaining a head of air pressure at the right, or entry, end of the combustion chamber 16, during low power outputs, whereby a considerable volume of air will immediately be available upon a demand for high power output. As will next appear, the maintenance of air pressure at the entry end of the combustion chamber and the relatively high speed of the compressor wheel is effected by partially blocking air flow through the combustion chamber.

In the present embodiment and as best seen in FIGURE 1, combustion chamber 16 is tapered from end to end thereof with its largest diameter end adjacent the compressor section 10 and its smallest diameter end adjacent the first stage power section 11. The previously mentioned fuel nozzle 22 is disposed within the combustion chamber and partially blocks flow of air discharged from the compressor section 10, therethrough. As will be apparent, the degree of flow blockage by the nozzle 22 will be dependent upon its position within the combustion chamber; for example, when the nozzle is at the left toward the smaller end of the chamber, minimum space will be provided for air flow between the nozzle and the chamber interior. On the other hand, when the nozzle is moved to the right toward the larger end of the chamber, maximum space will be provided for air flow between the nozzle and the chamber interior.

Still referring to FIGURE 1, the nozzle 22 is shown in full lines in the position it will occupy during low engine power outputs. Since flow of air through the combustion chamber is thus partially blocked, air pressure will be built up by the compressor section 10 at the right end of the combustion chamber. Moreover, since but little air volume is being pumped by the compressor section, the compressor wheel will be doing very little work and will thus tend to rotate freely against but small resistance. Since there is but little resistance to rotation of the compressor wheel, the small amount of gasses passing through the first stage housing 11.2 at this time will tend to rotate the compressor wheel at relatively high speed.

When high engine power is required, the nozzle 22 will be shifted to the right thus permitting a greater flow of air through the combustion chamber. With the nozzle shifted to the right toward the large end of the combustion chamber, the air pressure existing thereat will immediately move through the combustion chamber to the left where it will be mixed with an increased amount of fuel. The sudden increase in air-fuel flow through the combustion chamber and its ignition therein will provide a large and instantaneous increase in the flow of gasses discharged into the first stage housing 11.2. Such large flow of gasses will also, of course, immediately increase the power output of the second stage turbine wheel 12.1.

As the pressure at the right end of the combustion chamber 16 escapes to the left as above disclosed, the compressor wheel 10.1 will begin to pump a large volume of air into the combustion chamber and since the compressor wheel is already rotating at relatively high speed as previously disclosed, a large flow of air into the combustion chamber will be forthcoming without delay. This large flow of air will be mixed with an appropriate amount of fuel thus maintaining the high level of gas flow through the housings 11.2, 12.2. Accordingly, high engine power output will be achieved nearly immediately, the only delay being occasioned by the necessity of accelerating the second stage turbine wheel 12.1.

It should be understood that since the compressor wheel 10.1 does very little work at lower power output; i.e., it is only pumping that volume of air required for the particular power output, fuel consumption is materially less than with conventional gas turbines at comparable power outputs whose compressors pump an excess volume of air at such times.

While air flow through the combustion chamber of the present device at low power outputs is controlled by the position of the nozzle 22 therein, it will be apparent that the same result may be obtained by a butterfly or similar type of valve mounted at the entry end of the combustion chamber. A further refinement, although admittedly more complex, would be to vary the position of the compressor wheel vanes to decrease their air moving efficiency at low power outputs. This latter expediency would permit high rotational speeds of the compressor wheel at low power outputs and would make immediately available a large volume of air upon shifting of the vanes to a position of high air moving efficiency from a position of low air moving efficiency.

Another factor tending to make the present device more efficient than conventional gas turbines are the power turbine wheels 11.1, 12.1 and their associated housings 11.2, 12.2. Conventional power turbine wheels generally fall into two classes, distinguished by the manner in which gasses flow therepast to effect rotation thereof; firstly, there is the axial inflow, radial outflow wheel (similar to the present compressor wheel 10.1), or its inversion, the radial inflow, axial outflow wheel. Secondly, there is the axial flow wheel. By the same standards, the present power turbine wheels may be described as circumferential flow wheels.

Since wheels 11.1 and 12.1 are substantially the same, a description of one will be sufficient. Moreover, since wheel 12.1 is more clearly illustrated than is wheel 11.1, it is the former which will be described in detail.

With reference to FIGURES 2 and 5, wheel 12.1 comprises a central portion 12.3 with radially outwardly projecting, spaced-apart peripheral vanes 12.4. Both the wheel central portion 12.3 and the vanes 12.4 are as close a fit as practicable within the housing 12.2, but without touching the latter, to minimize gas leakage therebetween. For greater efficiency, vanes 12.4 are inclined away from the direction of wheel rotation. This not only makes the incoming gasses more efficient in rotating the wheel but also assists escape of the outgoing gases from the housing 12.2 after they have done their work in rotating the wheel.

With reference to FIGURE 5, the rapidly expanding gasses discharged from the first stage housing 11.2 will enter the second stage housing 12.2 at the periphery of the wheel 12.1 through the previously mentioned opening 17. Such gasses will impinge upon the vanes of wheel 12.1 and in attempting to escape through the opening 21 of the housing 12.2, also at the periphery of the wheel 12.1, such gasses will rotate the wheel in the direction indicated. In passing between the housing openings 17, 21, it will be clear that the gasses travel in the indicated, circumferential path through the housing.

Since the gasses passing through the housing 12.2 travel about the periphery of the wheel 12.1, the rotational force exerted thereby has maximum mechanical advantage thus exerting maximum torque on the wheel at minimum rotational speeds thereof. Moreover, because of the close fit between the wheel and the housing, very little gas can escape through the housing outlet opening 21 without forcing rotation of the turbine wheel. This is in sharp contrast to prior art turbine wheels and their housings which can permit considerable gas to escape without doing any useful work, especially at low turbine wheel speeds.

In view of the efficiency of the present power turbine sections 11, 12 at relatively low speeds, even full power output of the instant gas turbine permits much lower rotational speeds of the turbine wheels 11.1, 12.1. Accordingly, many of the problems and disadvantages of conventional gas turbine engines, traceable to extremely high turbine speeds, are either eliminated or at least markedly reduced by the instant structure.

In view of the foregoing it will be apparent to those skilled in the art that I have accomplished at least the principal object of my invention and it will also be apparent to those skilled in the art that the embodiment herein described may be variously changed and modified, without departing from the spirit of the invention, and that the invention is capable of uses and has advantages not herein specifically described; hence it will appreciated that the herein disclosed embodiment is illustrative only, and that my invention is not limited thereto.

I claim:

A gas turbine engine comprising a power section with rotatable first and second power wheels enclosed in housing means providing gas inlets and gas outlets for respective power wheels, the gas outlet of said first power wheel housing means being connected with the gas inlet of said second power wheel housing means whereby the exhaust from the first power wheel drives said second power wheel, an air compressor section having a rotatable compressor wheel driven by said first power wheel and enclosed in a housing providing an air inlet and an air outlet, a heat exchanger having portions providing for the separate flow therethrough, in heat transfer relation, of exhaust gases and inlet air for heating of the latter by the former, first duct means connecting said compressor wheel housing outlet with said first power wheel housing means inlet, a combustion chamber forming part of said first duct means in which fuel is burned to drive said power wheels, and second duct means connected to said compressor wheel housing inlet and through which air is drawn into said compressor section, said second duct means at least partially enclosing said first and second power wheel housings and directing flow of air thereover for cooling purposes, the exhaust gas portion of said heat exchanger being connected to the outlet of said second power wheel housing means and the inlet air portion of said heat exchanger forming a part of said second duct means and being interposed between said compressor wheel housing inlet and the portion of said second duct means enclosing said power wheel housing means.

References Cited by the Examiner

UNITED STATES PATENTS

| | | | |
|---|---|---|---|
| 1,174,439 | 3/1916 | Pelley | 60—39.16 X |
| 2,411,227 | 11/1946 | Planiol et al. | 60—39.66 X |
| 2,600,235 | 6/1952 | Galliot | 60—39.66 X |
| 2,618,926 | 11/1952 | Pfenninger | 60—39.16 X |
| 2,663,141 | 12/1953 | Hage | 60—39.16 |
| 2,715,814 | 8/1955 | Barr | 60—39.25 X |
| 3,066,488 | 12/1962 | Mock | 60—39.25 X |
| 3,133,416 | 5/1964 | Mock | 60—39.16 |

FOREIGN PATENTS 662,867  12/1951  Great Britain.

JULIUS E. WEST, *Primary Examiner.*